United States Patent Office 2,909,904
Patented Oct. 27, 1959

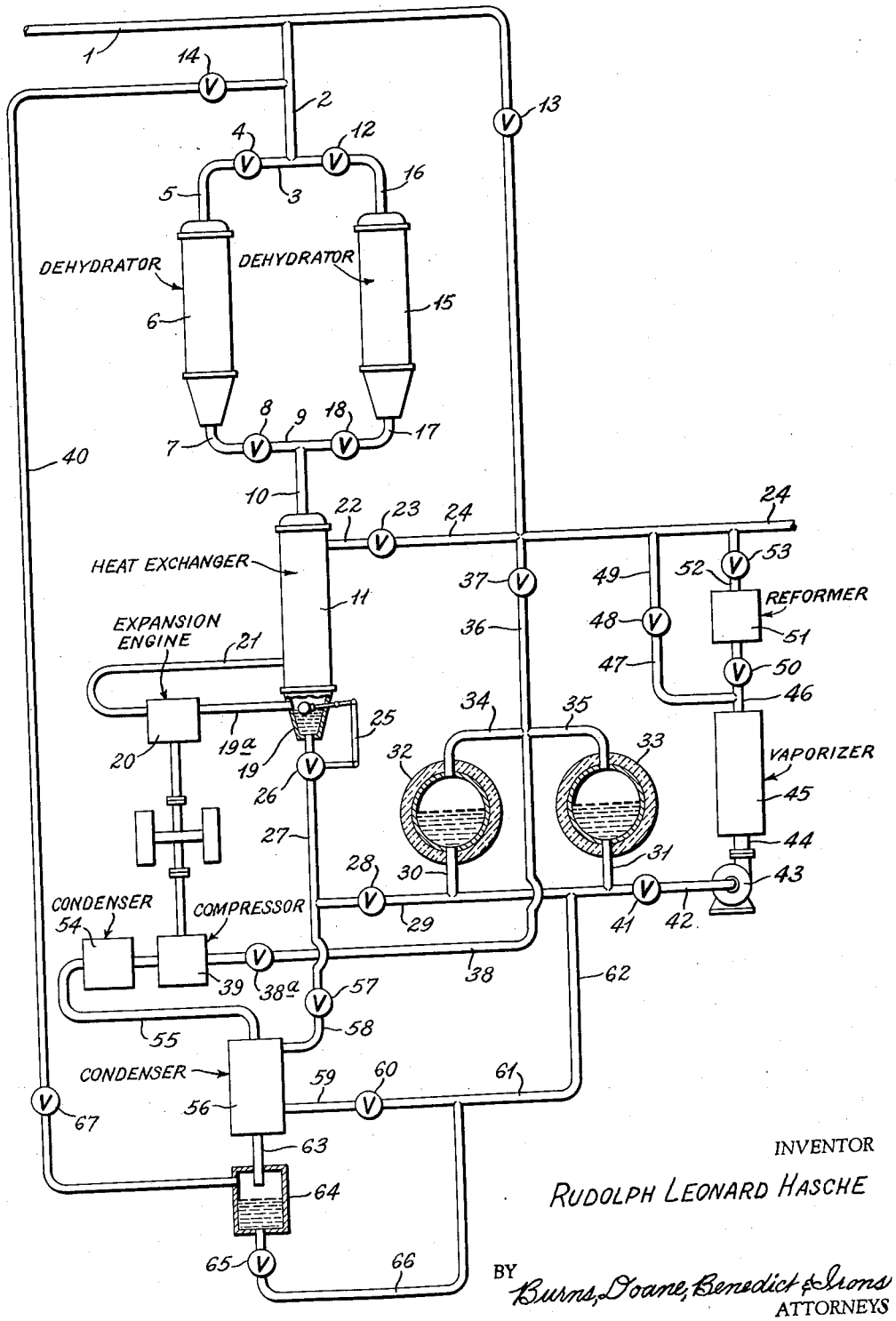

2,909,904

TREATMENT OF NATURAL GAS IN DISTRIBUTION SYSTEMS

Rudolph Leonard Hasche, Johnson City, Tenn.; Blanche K. Hasche, executrix of said Rudolph Leonard Hasche, deceased, assignor to Carbonic Development Corporation, Johnson City, Tenn., a corporation of Delaware Application December 26, 1956, Serial No. 630,482

12 Claims. (Cl. 62—23)

The present invention describes a new and improved process for the separation and storage of natural gas constituents for later use in distribution systems. More particularly, it comprises a new method for a public or private consumer of natural gas to recover and store heavier constituents of natural gas during a period of ample supply, such as in the summer season, to furnish a reserve supply during the winter season or period of short supply or interruption of natural gas service.

With continued growth in the use of natural gas throughout the world, and particularly in the United States, the peaks in demand in the heating season in the winter have made more acute the problem of building up reserves for peak periods. The problem is partly met by increasing the amount of natural gas sold by the distributors on an interruptible basis. This method causes inconvenience particularly to industrial users requiring them, in many cases, to provide their own standby facilities and also leads to loss in revenue to the natural gas distributor since it requires a lower price to compensate for the interruption in service.

There are several other partial solutions to the problem of bridging over periods of peak demands for natural gas. One of the methods which can be used in certain locations is to pump excess gas available in the summer season into underground storage structures. This method has been used in a limited number of locations where underground storage basins, such as depleted oil or gas fields, exist. However, this solution is not universally available or entirely satisfactory due to losses and contamination. Another method is to pump excess natural gas in the summertime into very high pressure steel storage cylinders. However, this method is very expensive, hazardous and requires expensive compressor equipment. Still another method which was attempted was to liquefy natural gas and store it at low temperature. A fatal accident at Cleveland several years ago has stopped the development of this method. Still another method is to provide stand-by sources of peak shaving or standby supply. This method entails the use of equipment for making oil gas that can be diluted with air, reforming units operating on propane or natural gasoline or propane-air systems. All of these latter systems require the purchase of auxiliary supplies of hydrocarbon feed stocks at a fluctuating market price. Extra operating staffs, to be maintained for emergency operations, are also required.

The present invention has for its primary object the provision of an economical, self-contained method for operating a gas distribution plant whereby there is recovered from natural gas supplied to the plant during periods of normal or minimum demand, as in the summertime, the heavier and higher molecular weight constituents, such as ethane, propane, butanes, pentanes and higher hydrocarbons in liquid form, for storing the liquefied product so obtained at a comparatively low pressure which is automatically maintained, and for returning the stored product in gaseous form to the distribution system in periods of peak demand or as a sole supply of gas in case of interruption of the primary source of supply.

A further object of the invention is to carry out the process, as above referred to, without the use of sources of heat or power not inherently present in the gas plant.

Yet another object of the invention is to provide a reserve supply of gas for use during periods of peak demand at a lower cost for investment and operation than is possible by methods known to the prior art.

My invention involves the separation and liquefaction of heavier constituents of natural gas, i.e., ethane and hydrocarbons boiling at temperatures higher than ethane, employing as the refrigeration requisite to effect such liquefaction low temperature obtained by the adiabatic expansion of gas from a transmission line pressure to an intermediate pressure generally corresponding to that employed in the gas distribution line. The cold, liquefied product is stored at substantially the pressure of the distribution line. The cold, adiabatically expanded stripped gas from which the liquefied product is separated, is passed in heat exchange relationship with the high pressure gas from the transmission line to cool such gas and to effect condensation of the heavier constituents thereof.

This invention is addressed primarily to a method and system for use in a gas plant which obtains fuel gas, such as natural gas, from a high pressure pipe line or transmission line, and converts such gas to a substantially lower pressure for distribution in a distribution line to ultimate consumers.

Throughout this specification, the term "transmission line" is used to refer to the high pressure pipe line from which the gaseous product is received by the distribution plant. Similarly, "transmission line pressure" refers to the pressure of the gas in the transmission line, normally about 400 to 1000 pounds per square inch. In like manner, the term "distribution line" refers to the line by which the plant distributes its heating gas product at a substantially lower pressure to ultimate consumers. The term "distribution line pressure," accordingly, refers to the pressure of the product heating gas in the distribution line, normally a pressure of about 50 to 200 pounds per square inch.

A particular advantage of the invention resides in the storage of the cold, liquefied heavier constituents under substantially the distribution line pressure. This liquefied product is maintained at a low temperature in substantial equilibrium with the distribution line pressure. The liquid product, which is a mixture of ethane, propane, butanes, pentanes and higher hydrocarbons (together with some dissolved methane which is discharged into the transmission line by an inherent degassing which is described hereinafter), if allowed to come to room temperature in a sealed vessel would exert a pressure of over 500 pounds per square inch and would, therefore, require expensive storage tanks together with elaborate safety precautions. However, in my process the cold liquid formed in the system is substantially continuously, at least during periods of normal or minimum demand, flowed into the storage vessels to make up for heat loss through the walls of the vessels, and if such cold liquid is insufficient to maintain the liquid in the storage vessels at equilibrium temperature, small amounts of liquid in the storage vessels will automatically boil off into the distribution line and thereby supply additional refrigeration. Methane, which is dissolved in the liquid product at the primary condensation pressure, is released in the storage vessels and may be either passed into the distribution line or recompressed to the transmission line pressure by power available from an expanding engine employed in the system, as explained in detail hereinafter. It will be appreciated that the system may be operated intermittently as well as continuously, refrigeration supplied by the boiling of the liquid product in the storage vessels being sufficient alone to maintain equilibrium conditions for a reasonable period of time. The system of this invention, including the method and apparatus, is integral with the transmission and distribution of gas lines and with conventional gas plant equipment. The system provides maximum safety coupled with automatic control.

My invention has almost universal application for municipal gas distribution systems, and gas distribution systems operated independently by large industrial consumers where natural gas is obtained from cross-country transmission lines. In general, natural gas in cross-country transmission lines is piped under high pressure and arrives at the municipal or industrial gas distribution system at pressures of from about 400 to 1000 pounds per square inch gauge. The distribution plant is operated to reduce the pressure of the gas in the pipe line to a distribution line pressure which is normally in the range of from about 50 to 200 pounds per square inch gauge. The reduction in pressure is carried out by pressure reducing valves in free expansion.

According to my invention, the energy residing in the gas while at transmission line pressure is utilized by adiabatic expansion in an expansion engine of conventional design, and the refrigeration thus obtained is employed to effect condensation of the heavier constituents of the gas. A separation normally of at least about 5% of the total heating value of the natural gas is thus effected, while the heating valve of the stripped gas from which the liquefied material is separated on a cubic foot basis is reduced to a lesser extent, since the heavier constituents of the gas are characterized by a higher heating value per cubic foot than the lighter constituents, such as methane. For example, if 7% of the total heating value of a natural gas is removed by condensing out one-half of the ethane in the gas, which originally contained 10% ethane and about 90% methane, the heating value of the gas on a cubic foot basis would be reduced from 1078 B.t.u./c.f. to 1040 B.t.u./c.f. or only about 3.8%. Similarly, if the natural gas contained propane and butane, the removal of an equal percentage of the total heating value of the gas by the condensation and separation of these heavier constituents would result in a substantially lesser reduction of the heating value per cubic foot of the stripped gas.

The features and method of operation of my invention will be best understood by description and reference to the drawing, which is a diagrammatic representation of one form of equipment which may be used in the practice of the invention.

Natural gas supplied from a high pressure transmission line, not shown, at a pressure of about 1000 pounds per square inch to about 400 pounds per square inch enters the system by pipes 1, 2 and 3, valve 4, and pipe 5, and is dehydrated by passage through dehydrator 6, which is of conventional design, and may appropriately contain silica gel as a dehydrating agent. The dehydrated gas, still at substantially the transmission line pressure, then flows through pipe 7, valve 8, and pipes 9 and 10 into the tube side of the heat exchanger 11, which is of the standard tube and shell design. Valves 12, 13 and 18 are closed, and valve 14 operates to foreclose passage of the gas through the pipe 40.

Dehydrators of the type above referred to become fully charged or loaded with moisture and must be reactivated as by passing hot air therethrough and thereafter cooling. In the practice of this invention, suitable cooling can be effected by passing a portion of the cooled, dry natural gas obtained by separation of the liquid fraction formed in the heat exchanger therethrough. Since such dehydrators cannot be continuously operated, a system of two dehydrators for alternate operation is employed. To this end, a second dehydrator 15, similar to dehydrator 6, is provided. The dehydrator 15 is connected the pipe 3 by valve 12 and pipe 16, and to the exchanger 11 by pipe 17, valve 18, pipe 9 and pipe 10. When it is desired to reactivate the dehydrator 6, valves 4 and 8 are closed and valves 12 and 18 are opened. Gas from the transmission line then enters the system through pipes 1, 2 and 3, valve 12, and pipe 16, and then is dehydrated by passage through the dehydrator 15. From the dehydrator 15, the dry gas flows through pipe 17, valve 18, and pipes 9 and 10 into the heat exchanger 11.

The dry natural gas, still at transmission line pressure, passes downwardly through the tube side of the heat exchanger 11 and is thereby cooled to a temperature normally of at least about −75° F. and preferably from about −90° F. to about −130° F. to effect condensation of the heavier constituents of the gas including ethane, propane, butanes, pentanes and heavier hydrocarbons. The liquefied material so produced is collected in the pot 19 at the bottom of the heat exchanger 11. The cold stripped gas from which the liquefied product is separated flows through pipe 19a into the expansion engine 20, which may be of any conventional design, wherein the cold gas is expanded adiabatically doing external work, thereby cooling the gas to a temperature of about −150° F. to about −250° F., preferably approximately −200° F., and lowering the pressure of the gas to distribution line pressure of about 150 to about 250 pounds per square inch, preferably approximately 200 pounds per square inch. The final temperature of the expanded gas depends upon the degree of the expansion in the expansion engine. In a typical case, the dry gas is expanded from a transmission line pressure of about 600 pounds per square inch to a distribution line pressure on the order of about 200 pounds per square inch gauge to provide an expanded gas at a temperature of about −200° F. The expanded gas at the low temperature above referred to exits from the expansion engine through the pipe 21 and is passed into the shell side of the heat exchanger 11 where it is passed in heat exchange relationship with the incoming dry gas from the transmission line. The expanded gas is warmed by the aforementioned passage through the heat exchanger to a temperature of from about 15° F. to about 50° F., preferably approximately 30° F., below the temperature of the incoming gas which enters the heat exchanger through the pipe 10. The expanded, stripped gaseous product then exits through the heat exchanger through the pipe 22 and flows through the valve 23 into the distribution line 24 for transmission to ultimate consumers.

The liquefied material which is recovered in the pot 19 is continuously transferred, preferably automatically, by conventional flow control means shown at 25, through valve 26, pipe 27, valve 28 and pipes 29, 30 and 31 to insulated storage tanks 32 and 33. There may be as many storage tanks as desired or required. Pipes 34 and 35 are provided at the top of the storage tanks 32 and 33 and are connected through pipe 36 and valve 37 to the main distribution line 24. Normally, the valve 37 is in open position so as to maintain the liquid in the storage tanks 32 and 33 under substantially the pressure of the distribution line. It will be apparent that the temperature of the liquid in the tanks 32 and 33 will be governed by the distribution line pressure, the composition of the liquid in the tanks, and the heat flow from the outside into the liquid in the tanks. The liquid flowing into the storage tanks 32 and 33 from the above described liquefaction operation will normally be at a temperature in the neighborhood of −100° F. However, in the storage tanks heat flow from the surroundings will gradually raise the temperature of the liquefied product until pressure equilibrium conditions are established between the product in the storage tanks 32 and 33 and the distribution line pressure. The ultimate composition of the liquid in the storage tanks 32 and 33 will depend upon the composition of the original gaseous material which is treated in accordance with the invention and the degree of expansion of the stripped gas which is carried out in the expansion engine. The degree of expansion in turn is a function of the difference in pressure between the transmission line and the distribution line. The greater the ratio of transmission line pressure to the gas distribution line pressure and consequently the degree of expansion in the engine or turbine, the greater the refrigeration obtainable and consequently the recovery of hydrocarbons heavier than methane. The examples hereinafter set forth illustrate the effect of the foregoing factors.

In the condensation of ethane, propane, butanes, pentanes, and heavier hydrocarbons in the heat exchanger 11, some methane will be contained in the liquid due to solubility effect. However, in passing through the valve 26 an expansion occurs from the transmission line pressure to substantially the distribution line pressure, and consequently the methane will be released from the liquid in the storage tanks 32 and 33 and will flow back into the main transmission line. In other words, in the tanks 32 and 33 and in the course of transmission of the liquid product to such tanks, degassing occurs thereby stabilizing the liquefied product.

The methane released in the storage tanks 32 and 33 by reduction in pressure will normally contain substantial amounts of ethane and lesser quantities of propane and heavier hydrocarbons. In addition to the effect of reduction of pressure in causing release of the hydrocarbons, the heat from the surroundings conducted through the walls of the storage vessels will cause vaporization of some of the liquid hydrocarbons to compensate for the heat flow into the system. For example, if the liquid condensed in the heat exchanger 11 leaves the pot at a temperature of −130° F. the storage vessels 32 and 33 may come to an equilibrium temperature of −50° F. due to expansion to approximately the distribution line pressure, due to heat transfer from the surroundings through an economical amount of insulation.

The vaporized hydrocarbons from storage vessels 32 and 33 are drawn through pipe 38 and valve 38a into compressor 39 powered by expansion engine 20, where they are compressed to the transmission line pressure and passed through a water-cooled condenser 54, thereby cooling the gas to approximately 80° F. whereupon a portion of the propane and heavier hydrocarbons will condense. The compressed gas and condensed liquid then pass through pipe 55 into condenser 56 thereby condensing ethane and further quantities of propane and heavier hydrocarbons. The cooling agent for condenser 56 is provided for by a portion or all of liquid hydrocarbon mixture recovered in heat exchanger 11. In this type of operation, valve 28 is closed and valve 57 is open, whereby the cooling fluid flows through pipe 58 through the shell side of condenser 56 and passes out through reducing valve 60 and pipes 61 and 62 to the storage tanks 32 and 33. The liquid hydrocarbon condensate passes through pipe 63 into pot 64, thence through reducing valve 65, pipe 66, and joins the main portion of liquid hydrocarbons in pipe 62 and passes to storage tanks 32 and 33. The uncondensed gas which is mainly methane leaves the pot 64 through pipe 40, passing through reducing valve 67 and check valve 14 to the transmission line pressure.

Since the pressure on the liquid in pot 19 corresponds generally to the transmission line pressure (i.e., 400–1000 p.s.i) and the pressure on the liquid in storage vessels 32 and 33 corresponds generally to the distribution line pressure (i.e., 50–200 p.s.i.), the liquid from pot 19 readily will flow to storage. The liquid from pot 19 is below its boiling point and consequently is capable of absorbing heat without vaporizing an equivalent amount of liquid. This invention utilizes the refrigerating qualities of this liquid to aid in preventing the loss of vaporized liquid from the storage tanks.

The advantage of recovery of the hydrocarbons vaporized due to heat losses and expansion of the liquid in the storage tanks is very important. During the operation of the separation unit, heat losses in the storage system are automatically compensated for and no external energy is required since the power for the compression of the recovered hydrocarbons is supplied by the power generated by the expander engine cylinder 20.

The automatic pressure control, safety and economic advantages of the separation storage and stand-by reserve of the process described in this invention are apparent.

If the separation unit is closed down, valve 28 is closed, and the storage tanks will be maintained at substantially the pressure of the distribution system. Heat flow with the storage system will lead to vaporization of liquid hydrocarbons to maintain the temperature, and the vaporized product will automatically pass into the distribution system without manual or instrumental control. Upon restarting of the separation unit, liquid is again supplied to make up for the vaporization during the shutdown and continuous operating equilibrium is reestablished.

It will be understood by one skilled in the art that, if desired, while the separation unit is closed down, an external refrigeration unit can be employed to recover and condense as liquids the hydrocarbons vaporized in storage tanks 32 and 33 due to heat flow from the surroundings into the storage system.

In the above description of the method of operation the pressure limits of the operation have been stated to be between the transmission line pressure and approximately the distribution line pressure. It may be desirable to maintain the pressure in the storage tanks slightly above the average distribution line pressure in order to compensate for fluctuations. In other words, valve 37 may be a pressure regulating valve which it may be desirable to set to operate somewhat above the distribution line pressure in effect at any time. However, it is evident that the high and low pressure parts of the systems are always in pressure relationship with each other at all times and are automatically controlled.

The above description has dealt with the operation and separation of the storage procedures which comprise one part of the invention. The operation of this system will be carried out during the larger part of the year, during the spring, summer, and fall, when the demand for gas can be readily met by the transmission line. Now, during the colder months when the demand exceeds the supply, or at least exceeds the demand load contracted for by the municipal or industrial plant, the reserve supply can be drawn upon. To this end, valve 41 is opened and the liquid is fed through pipe 42, pump 43, and pipe 44 to vaporizer 45. If the demand is not large, the vaporized product can be fed directly into the distribution line through pipes 46 and 47, valve 48 and pipe 49. If the demand is so great that the heating value of the natural gas is raised to an extent greater than desired, valve 48 is closed and the valves 50 and 53 are opened, thereby allowing the vaporized product to be mixed with air or otherwise reformed to lower the heating value, for example, to approximately 1050 B.t.u./cubic foot in a standard apparatus indicated at 51, the gas flow being through the pipe 46, the valve 50, the reformer 51, the pipe 52, and the valve 53, to the distribution line 24.

In the case when heavy withdrawal is made at peak demand, there is no occasion to operate the separation unit. Accordingly, valves 28 and 23 are closed and the main pressure reducing valve 13 is opened between the transmission and distribution lines, so that the separation unit is bypassed from the gas system.

The following examples will illustrate the practice of the invention, but the invention is not restricted to the examples.

Example 1

A natural gas obtained from a cross-country transmission line was introduced into the separation system of this invention at the transmission line pressure of 600 lbs. per square inch gauge. The inlet composition of the natural gas was as follows:

|  | Percent |
|---|---|
| Carbon dioxide | 0.3 |
| Methane | 95.04 |
| Ethane | 3.2 |
| Propane | 0.9 |
| Butanes | 0.33 |
| Pentanes | 0.07 |
| Hexanes | 0.11 |
| Heptanes plus | .05 |
| Total | 100.00 |

This gas was passed through the pipes 1, 2 and 3, valve 4, and pipe 5, and was dehydrated in the dehydrator 6. After dehydration, the gas was passed through the pipe 7, valve 8, pipes 9 and 10 into heat exchanger 11 where it was cooled to a temperature of approximately −130° F. At the time of entry into the heat exchanger, the gas was at a temperature of about 80° F. The cooling of the gas in the heat exchanger resulted in the condensation of a liquid product comprising ethane and the hydrocarbons boiling higher than ethane which are present in natural gas, which liquid product contained in solution some methane and which was collected in the pot 19 at the bottom of the heat exchanger 11. The composition of the gas obtained by vaporizing the liquid product was:

|  | Volume percent |
|---|---|
| Methane | 9.1 |
| Ethane | 47.7 |
| Propane | 24.5 |
| Butanes | 9.8 |
| Pentanes plus | 8.9 |
| Total | 100.0 |

The liquid product was equivalent to 6.8% of the total heating value of the inlet natural gas, while the heating value of the gas per cubic foot was reduced only from 1051 to 1010 B.t.u./cubic foot. The calorific value of the gas obtained by vaporizing the liquid product was 2241 B.t.u./cubic foot. The stripped gas from which the liquid product was separated flows through pipe 19a into expansion engine 20, where it was expanded from the transmission line pressure of about 600 lbs. per square inch gauge to a pressure of about 200 lbs. per square inch gauge which corresponded to the distribution line pressure. After the expansion, the gas was at a temperature of about −200° F. This cold expanded gas was passed through pipe 21 upwardly through the shell portion of the heat exchanger 11 to effect cooling of the incoming natural gas and was thereafter withdrawn from the heat exchanger through pipe 22 and valve 23 into the main distribution line 24. The temperature of the expanded gas at the time of entry into the pipe 22 was about 30° F. below the temperature of the incoming dehydrated gas product.

The liquid product collected in the pot 19 was automatically transferred by float control 25 through the valve 26, pipe 27, valve 28, and pipes 29, 30 and 31 into storage tanks 32 and 33. By means of pipes 34, 35 and 36, and open valve 37, the liquid in storage tanks 32 and 33 was maintained at equilibrium with the pressure in the gas distribution line 24. A continuous flow of the cold product from the pot 19 compensates for heat flow from the surroundings into the tanks 32 and 33 with ultimate establishment of an equilibrium between the liquid product in the tanks 32 and 33 and the gas distribution line pressure. Methane contained in the liquid collected in the pot 19 passes off through the pipes 34, 35 and 36, and valve 37 into the distribution line 24.

An alternate method of operation is to absorb the work done by the expander by generating electric power or compress another source of gas.

The foregoing method of operation is carried out during periods of normal or other than peak demand. In periods of peak demand, when it is necessary to supplement the supply of natural gas obtainable by the plant, the liquid product in the tanks 32 and 33 is withdrawn through the pipes 29, 30 and 31, the valve 41, pipe 42 and passed by the pump 43 through pipe 44 into the vaporizer 45.

Alternatively, the product may be passed into the distribution line from the vaporizer through pipes 46 and 47, valve 48, and pipe 49, valve 50 being closed.

If the demand is excessive, it may be desirable to reform the vaporized gaseous product before introduction into the transmisison line. This is effected by closing the valve 48 and passing the vaporized product obtained from the vaporizer 45 through the pipe 46, valve 50, reformer 51, the pipe 52, and the valve 53 into the distribution line 24.

Example 2

The process as described in Example 1 was repeated with the exception that in this instance the natural gas employed has an inlet composition as follows:

|  | Percent |
|---|---|
| Methane | 81.97 |
| Ethane | 10.00 |
| Propane | 3.25 |
| Butanes | .61 |
| Pentanes plus | .24 |
| Nitrogen | 3.93 |
| Total | 100.00 |

In this example, the gas was expanded in the system from the transmisison line pressure of 600 lbs. per square inch gauge to the distribution line pressure of 150 lbs. per square inch gauge.

The liquid product obtained was equivalent to 10% of the total heating value of the inlet natural gas, while the total heating value of the inlet gas was reduced only from 1105 to 1032 B.t.u./cubic foot. The composition obtained by vaporizing the liquid product collected in the pot 19 was as follows:

|  | Volume percent |
|---|---|
| Methane | 9.2 |
| Ethane | 21.4 |
| Propane | 55.3 |
| Butanes | 11.1 |
| Pentanes plus | 3.0 |
| Total | 100.0 |

The calorific value of the gas obtained by vaporizing the liquid product collected in the pot 19 was about 2362 B.t.u./cubic foot.

Example 3

The process of Example 1 was repeated with the exception that in this instance the gas was supplied at a transmission line pressure of about 1000 lbs. per square inch which was expanded to a distribution line pressure of about 100 lbs. per square inch. The results were similar to those described in Example 1 except for the presence of some additional methane in the liquid product collected in the pot 19, which in turn increased the amount of methane flashed in storage vessels 32 and 33. The methane flashed carried with it about 40% by volume of ethane, or approximately 25% of the latter constituent present in the liquid condensate in pot 19. In order to prevent the loss of ethane, the methane flashing from storage vessels 32 and 33 carrying ethane vapor and some propane vapor and heavier hydrocarbons were drawn through pipe 38 and valve 38a into compressor 39 powered by expansion engine 20, where they were compressed to the transmission line pressure and passed through water-cooled condenser 54 thereby cooling the gas to approximately 80° F. whereupon a portion of the propane and heavier hydrocarbons condensed. The compressed gas and condensed liquid then pass through pipe 50 into condenser 56 thereby condensing ethane and further quantities of propane and heavier hydrocarbons.

Cooling agent for condenser 56 required the passage of all of the liquid hydrocarbon mixture recovered in heat exchanger 11 in order to reduce to approximately −50° F. and condense the hydrocarbons higher than methane. In cases where the relative solubility of methane in the liquid mixture recovered in pot 19 is less only a portion of the cooling liquid is required for heat exchanger 56 and the balance can be admitted, if desired, directly to storage tanks 32 and 33 through valve 28.

*Example 4*

The process of Example 1 was repeated with the exception that in this instance the gas was supplied to the system at a transmission line pressure of 400 lbs. per square inch and was expanded to a distribution line pressure of about 50 lbs. per square inch. The results were analogous to those described with reference to Example 1.

While this invention has been described particularly with reference to natural gas, it is applicable to the treatment of other forms of heating gas which are conventionally supplied to gas distribution plants. Various forms of synthetically produced or reformed gas can be distributed in accordance with the method of this invention.

While the invention has been herein described particularly with reference to storing the liquefied gaseous product under essentially the distribution line pressure, it will be appreciated that it is within the purview of the invention to store the liquid product under a pressure intermediate the transmission line pressure and the distribution line pressure. Such intermediate pressure could, for example, be effected if the stripped gas were issued from the heat exchanger at a pressure in excess of that at which it is ultimately passed into the transmission line and the liquid product was stored under equilibrium with the gas at such intermediate pressure.

This application is a continuation-in-part of my application Serial No. 452,423, filed August 26, 1954, for Improvement in the Treatment of Natural Gas in Distribution Systems.

I claim:

1. A method of operating a plant for converting a high pressure natural gas supplied by a transmission line to a substantially lower pressure heating gas and for distributing said heating gas to consumers with a minimum of interruption, which comprises: (1) withdrawing said natural gas under transmission line pressure from the transmission line by which said gas is supplied to said plant; (2) cooling said gas while under substantially transmission line pressure to form (a) a condensed liquid fraction comprising predominantly ethane and hydrocarbons boiling at a temperature higher than ethane, and (b) a gaseous fraction comprising predominantly methane; (3) adiabatically expanding said gaseous fraction to an extent requisite to effect said cooling in step (2); (4) passing said cold expanded gaseous fraction in heat exchange relationship with said natural gas to effect the cooling in step (2) and thereafter passing said expanded gas into the distribution line of said gas plant; (5) passing at least a portion of said liquid fraction in the liquid state through a heat exchanger as a cooling medium; (6) passing the liquid fraction from the heat exchanger to storage vessels maintained in communication with the distribution line during operation of the said plant and wherein said liquid fraction is maintained at a pressure substantially equal to that of the expanded gas in said distribution line; (7) compressing the gases vaporizing from said liquid fraction in the storage vessels; (8) passing the compressed gases through said heat exchanger in indirect heat exchange relationship with the liquid fraction formed in step (2) to produce a second condensed liquid fraction comprising predominantly ethane and propane and a second gaseous fraction comprising predominantly methane; (9) separating the second liquid fraction from the second gaseous fraction and passing the second liquid fraction in the liquid state into the said storage vessels; and (10) during periods of peak demand vaporizing the liquid in said storage vessels and introducing the gaseous material so obtained into said distribution line for use as a heating gas.

2. The process of claim 1 wherein said gaseous fraction is adiabatically expanded in step (3) to a pressure corresponding to the distribution line pressure maintained by said gas plant.

3. The process of claim 1 wherein said natural gas when withdrawn from said transmission line is under a transmission line pressure of from about 1000 to about 400 lbs. per square inch gauge, wherein said gas is cooled in step (2) to a temperature of not more than about −75° F., and wherein said gaseous fraction is adiabatically expanded in step (3) to a pressure of from about 150 to about 250 lbs. per square inch and thereby cooled to a temperature of about −150° F. to about −250° F.

4. A method of operating a plant for converting a high pressure natural gas supplied by a transmission line to a substantially lower pressure heating gas and for distributing said heating gas to consumers with a minimum of interruption, which comprises: (1) withdrawing said natural gas under a transmission line pressure of about 400 to about 1000 lbs. per square inch from the transmission line by which said gas is supplied to said plant; (2) cooling said gas while under substantially transmission line pressure to a temperature of about −90° F. to about −130° F. to form (a) a condensed liquid fraction consisting essentially of ethane and hydrocarbons boiling at a temperature higher than ethane, said condensed liquid fraction representing at least about 5% of the total heating value of said natural gas, and (b) a gaseous fraction consisting essentially of methane; (3) adiabatically expanding said gaseous fraction to a pressure of about 150 to about 250 lbs. per square inch thereby cooling said fraction to a temperature of about −150° F. to about −250° F.; (4) passing said cold expanded gaseous fraction in heat exchange with said natural gas to effect cooling in step (2) and thereby warm said gas to a temperature of from about 15° F. to about 50° F. below the temperature of the natural gas when withdrawn from said transmission line; (5) passing said expanded warm gas into the distribution line of said gas plant; (6) passing at least a portion of said liquid fraction in the liquid state through a heat exchanger as a cooling medium; (7) passing the liquid fraction from the heat exchanger to storage vessels maintained in communication with the distribution line during operation of the said plant and wherein said liquid fraction is maintained at a pressure substantially equal to that of the expanded gas in said distribution line; (8) compressing the gases vaporizing from said liquid fraction in the storage vessels; (9) passing the compressed gases through said heat exchanger in indirect heat exchange relationship with the liquid fraction formed in step (2) to produce a second condensed liquid fraction comprising predominantly ethane and propane and a second gaseous fraction comprising predominantly methane; and (10) separating the second liquid fraction from the second gaseous fraction and passing the second liquid fraction in the liquid state into the said storage vessels.

5. A method of operating a plant for converting a high pressure natural gas supplied by a transmission line to a substantially lower pressure heating gas and for distributing said heating gas to consumers with a minimum of interruption, which comprises: (1) withdrawing said natural gas under transmission line pressure from the transmission line by which said gas is supplied to said plant; (2) cooling said gas while under substantially transmission line pressure to form (a) a condensed liquid fraction comprising predominantly ethane and hydrocarbons boiling at a temperature higher than ethane, and (b) a gaseous fraction comprising predominantly methane; (3) adiabatically expanding said gaseous fraction to an extent requisite to effect said cooling in step (2); (4) passing said cold expanded gaseous fraction in heat exchange relationship with said natural gas to effect the cooling in step (2) and thereafter passing said expanded gas into the distribution line of said gas plant; (5) substantially continuously, at least during periods of ample supply of said natural gas, passing at least a portion of said liquid fraction in the liquid state through a heat exchanger as a cooling medium; (6) passing the liquid fraction from the heat exchanger to storage vessels maintained in communication with the distribution line during operation of the said plant and wherein said liquid fraction is maintained at a pressure substantially equal to that of the expanded gas in said distribution line; (7) compressing the gases vaporizing from said liquid fraction in the storage vessels; (8) passing the compressed gases through said heat exchanger in indirect heat exchange relationship with the liquid fraction formed in step (2) to produce a second condensed liquid fraction comprising predominantly ethane and propane and a second gaseous fraction comprising predominantly methane; (9) separating the second liquid fraction from the second gaseous fraction and passing the second liquid fraction in the liquid state into the said storage vessels; and (10) during periods of peak demand vaporizing the liquid in said storage vessels and introducing the gaseous material so obtained into said distribution line for use as a heating gas.

6. The process of claim 5 wherein said gaseous fraction is adiabatically expanded in step (3) to a pressure substantially corresponding to the distribution line pressure maintained by said gas plant.

7. The process of claim 6 wherein said vaporized liquid of step (10) is reformed to reduce the heating value thereof prior to introduction into said distribution line.

8. The process of claim 6 wherein said vaporized liquid of step (10) is introduced directly into said distribution line.

9. A method of operating a plant for converting a high pressure gas supplied by a transmission line to substantially lower pressure heating gas and for distributing said heating gas to consumers with a minimum of interruption during periods of peak demand, which comprises: (1) during periods of ample supply of said high pressure gas cooling said high pressure gas supplied to said plant to form (a) a condensed liquid fraction of relatively higher boiling constituents, and (b) a stripped gaseous fraction comprising the relatively lower boiling constituents of said gas; (2) substantially reducing the pressure of said stripped gaseous fraction and thereafter distributing said gaseous fraction as a low pressure heating gas to ultimate consumers; (3) passing at least a portion of said liquid fraction in the liquid state through a heat exchanger as a cooling medium; (4) passing the liquid fraction from the heat exchanger to storage vessels maintained in communication with the distribution line during operation of the said plant and wherein said liquid fraction is maintained at a pressure substantially equal to that of the expanded gas in said distribution line; (5) compressing the gases vaporizing from said liquid fraction in the storage vessels; (6) passing the compressed gases through said heat exchanger in indirect contact with the liquid fraction formed in step (1) to produce a second condensed liquid fraction comprising predominantly ethane and propane and a second gaseous fraction comprising predominantly methane; (7) separating the second liquid fraction from the second gaseous fraction and passing the second liquid fraction in the liquid state into the said storage vessels; and (8) during periods of peak demand vaporizing the liquid in said storage vessels and introducing the gaseous material so obtained into said distribution line for use as a heating gas.

10. A method for operating a plant for converting a high pressure natural gas supplied by a transmission line to a substantially lower pressure heating gas and for distributing said heating gas to consumers with a minimum of interruption, which comprises: (1) withdrawing said natural gas under transmission line pressure from the transmission line by which said gas is supplied to said plant; (2) removing moisture from and cooling said gas while under substantially transmission line pressure to form (a) a condensed liquid fraction comprising predominantly ethane and hydrocarbons boiling at a temperature higher than ethane, and (b) a gaseous fraction comprising predominantly methane; (3) adiabatically expanding said gaseous fraction to an extent requisite to effect said cooling in step (2); (4) passing said cold expanded gaseous fraction in heat exchange relationship with said natural gas to effect the cooling in step (2) and thereafter passing said expanded gas into the distribution line of said gas plant; (5) substantially continuously, at least during periods of ample supply of said natural gas, passing at least a portion of said liquid fraction in the liquid state through a heat exchanger as a cooling medium; (6) passing the liquid fraction from the heat exchanger to storage vessels maintained in communication with the distribution line during operation of the said plant and wherein said liquid fraction is maintained at a pressure substantially equal to that of the expanded gas in said distribution line; (7) compressing the gases vaporizing from said liquid fraction in the storage vessels; (8) passing the compressed gases through said heat exchanger in indirect contact with the liquid fraction formed in step (2) to produce a second condensed liquid fraction comprising predominantly ethane and propane and a second gaseous fraction comprising predominantly methane; (9) separating the second liquid fraction from the second gaseous fraction and passing the second liquid fraction in the liquid state into the said storage vessels; and (10) during periods of peak demand vaporizing the liquid in said storage vessels and introducing the gaseous material so obtained into said distribution line for use as a heating gas.

11. In a plant for converting a high pressure gas to a substantially lower pressure heating gas and for distributing said heating gas to consumers with a minimum of interruption, a system which comprises: a first heat exchanger, conduit means for conducting said gas from a transmission line under high pressure to said heat exchanger, an adiabatic expansion engine, means for conducting a gaseous effluent from said heat exchanger to said engine, conduit means for conducting expanded gaseous material discharged by said engine to said heat exchanger for passage in heat exchange relationship with said high pressure gas, storage means in fluid communication with the distribution line for liquids condensed from said gas in said heat exchanger, conduit means for conducting said liquids from said heat exchanger to said storage means, means for maintaining the interior of said storage means at a pressure equal to that of the expanded gases in the main distribution line of said gas plant, a compressor, conduit means for conducting vapors formed in the storage means to the compressor, a second heat exchanger, conduit means for conducting compressed vapors from the compressor to the second heat exchanger, conduit means for conducting liquid condensed in the first heat exchanger to the second heat exchanger for passage in indirect heat exchange relationship with the compressed vapors from the condenser, conduit means for conducting liquid condensed in the second heat exchanger to the storage means, and conduit means for removing the gas effluent from the second heat exchanger.

12. A system according to claim 11 in which conduit means are provided to conduct a gaseous effluent from the second heat exchanger to the first heat exchanger for admixture with gas from the transmission line.

References Cited in the file of this patent

UNITED STATES PATENTS

| | | |
|---|---|---|
| 2,535,148 | Martin et al. | Dec. 26, 1950 |
| 2,541,569 | Born et al. | Feb. 13, 1951 |
| 2,682,154 | Wilkinson | June 29, 1954 |
| 2,753,691 | Wissmiller | July 10, 1956 |